No. 720,293. PATENTED FEB. 10, 1903.
A. M. STOCKING.
CULINARY DEVICE.
APPLICATION FILED JUNE 27, 1902.
NO MODEL.
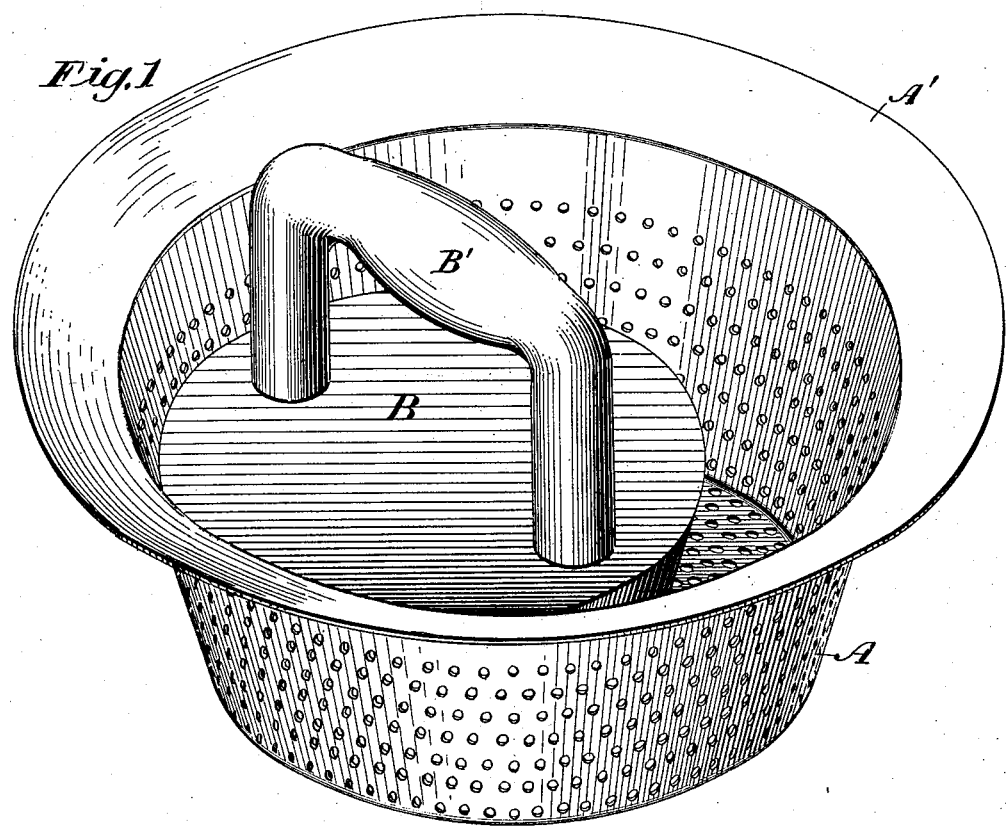
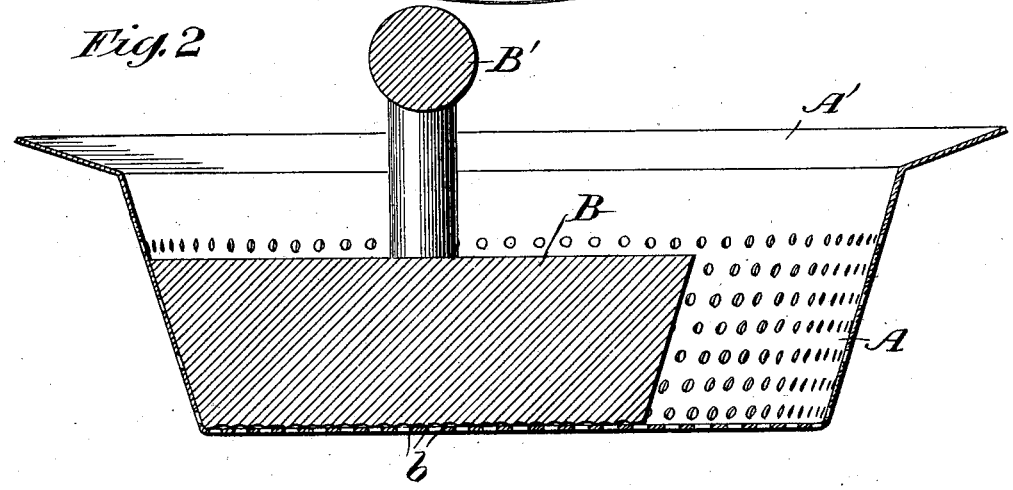

UNITED STATES PATENT OFFICE.

AMY M. STOCKING, OF WEST NEW BRIGHTON, NEW YORK.

CULINARY DEVICE.

SPECIFICATION forming part of Letters Patent No. 720,293, dated February 10, 1903.

Application filed June 27, 1902. Serial No. 113,487. (No model.)

*To all whom it may concern:*

Be it known that I, AMY M. STOCKING, a citizen of the United States, residing at West New Brighton, county of Richmond, State of New York, have invented an Improved Culinary Device, of which the following is a specification.

This device is intended for reducing potatoes and other vegetables and for straining fruits, as in making jams, marmalades, &c.

In the accompanying drawings, Figure 1 is a perspective view, and Fig. 2 a vertical section.

The device comprises two members, a pan or vessel A, having the shape of a frustum of a cone and perforated bottom and side walls, and a similarly-shaped plunger or masher B of smaller diameter, having an appropriate handle B', by which it may be freely rotated and moved in all directions within the pan. The pan is preferably formed with an inclined flange A' to rest upon the edge of a receiving vessel, over which it may be placed, the inclination of which when the pan is quite full prevents the material being treated and the juices or moisture therefrom passing out of the pan. In straining the juice and pulp of fruit from the stones or seeds and in reducing fruits, potatoes, pumpkin, &c., the plunger B may be manipulated within the pan, so as to afford an effective action both at the bottom and sides thereof, while such of the material as may be crowded upwardly or laterally by pressure of the plunger toward the side of the pan will readily fall away into the space between the opposite walls of the pan and plunger.

The bottom of the plunger may be corrugated, as indicated at $b$, this formation being for some purposes desirable. For the reduction of potatoes, apples, peaches, &c., the perforations in the pan may be of any appropriate diameter and may be substantially as indicated in the drawings, and when the device is to be used for the straining of berries and comparatively small seeds the perforations should be correspondingly small to prevent the passage of the seeds. The inclined sides and bottom of the plunger, both of which are relatively large, would coöperate most efficiently with the perforated bottom and inclined sides of the pan, and fruits and vegetables of all classes may be clearly strained or reduced. The reduced vegetables and fruits are of a better character, as they are not beaten into a pasty condition, as is the case where an ordinary colander and potato-masher are used for the purpose. The plunger is preferably made of hard wood, while the perforated pan may be of ordinary tin or enamel ware.

I claim as my invention—

A culinary device, comprising a vessel having a flat perforated bottom and perforated outwardly-inclined side walls, and a plunger of smaller diameter having a flat bottom resting on the bottom of the vessel, and compressing sides inclined correspondingly with the sides of the vessel and adapted to be rotated and moved laterally in all directions in the vessel, substantially as described.

In testimony whereof I have hereunto subscribed my name.

AMY M. STOCKING.

Witnesses:
W. R. DAVIDSON,
A. C. STOCKING.